(12) United States Patent
Lester

(10) Patent No.: US 8,451,612 B2
(45) Date of Patent: May 28, 2013

(54) SUPPLY-LINE MANAGEMENT DEVICE

(75) Inventor: Mylan Lester, Leintwardine (GB)

(73) Assignee: Creation Logics Ltd. (GB)

( * ) Notice: Subject to any disclaimer, the term of this patent is extended or adjusted under 35 U.S.C. 154(b) by 922 days.

(21) Appl. No.: 12/304,097

(22) PCT Filed: Jun. 12, 2007

(86) PCT No.: PCT/EP2007/005159
§ 371 (c)(1),
(2), (4) Date: Jul. 9, 2009

(87) PCT Pub. No.: WO2007/144135
PCT Pub. Date: Dec. 21, 2007

(65) Prior Publication Data
US 2010/0232871 A1    Sep. 16, 2010

(30) Foreign Application Priority Data

Jun. 12, 2006 (GB) .................................. 0611543.0

(51) Int. Cl.
*H05K 7/00* (2006.01)
(52) U.S. Cl.
USPC ........................................ 361/729; 362/147
(58) Field of Classification Search
USPC .... 361/825, 826, 728–729, 807–810; 362/96, 362/147, 148, 150, 285, 382, 394, 404, 418; 403/188, 190, 196, 199
See application file for complete search history.

(56) References Cited

U.S. PATENT DOCUMENTS

| | | | | |
|---|---|---|---|---|
| 3,704,350 A | | 11/1972 | Itoh | |
| 3,975,792 A | * | 8/1976 | Janson | 16/87.4 R |
| 4,108,523 A | * | 8/1978 | Bolis | 439/116 |
| 6,170,967 B1 | * | 1/2001 | Usher et al. | 362/394 |
| 6,716,042 B2 | * | 4/2004 | Lin | 439/110 |
| 7,111,957 B2 | * | 9/2006 | Bernhart et al. | 362/147 |
| 7,507,005 B1 | * | 3/2009 | Mier-Langner | 362/418 |

FOREIGN PATENT DOCUMENTS

FR    2 249 023    10/1973
GB    2 241 385 A    8/1991

OTHER PUBLICATIONS

International Searching Authority, Written Opinion of the International Searching Authority of PCT applciation PCT/EP2007/005159 filed Jun. 12, 2007, mailed Dec. 31, 2008, European Patent Office, Munich, Germany.
Examination Report from UK Intellectual Property Office for Appl'n No. GB0611543.0, dated Nov. 10, 2010.
Examination Report from UK Intellectual Property Office for Appl'n No. GB0611543.0, dated May 17, 2011.

\* cited by examiner

*Primary Examiner* — Hung S Bui
(74) *Attorney, Agent, or Firm* — Cook Alex Ltd.

(57) ABSTRACT

A line-management device for use in applications involving hoisting a load, the device having two or more parts, each part being releasably securable to at least one other part and comprising a body portion (1) and engaging means (6) and (7) for securably engaging with at least one other part and being shaped such that, in combination with the other part, a cavity is defined for receiving a load-bearing line, the device comprising attachment means (10) for attachment of a secondary line to be managed and, in use, the device being moveable longitudinally about the load-bearing line.

21 Claims, 1 Drawing Sheet

SUPPLY-LINE MANAGEMENT DEVICE

CROSS REFERENCE TO RELATED APPLICATIONS

This application is a national stage application based upon International Application No. PCT/EP2007/005159, filed Jun. 12, 2007, which claims priority from Great Britain Application No. 0611543.0, filed Jun. 12, 2006, the contents of both of which are incorporated by reference herein.

This invention relates to a device for managing a supply line to a load being moved. The device is particularly useful in applications involving hoisting a load where a secondary function, for example supply of data, power, compressed gas or water to the load, is required or desired during the hoisting operation.

In many industries or environments there is a need to be able to move a load between different heights, for example in construction, warehouses and dockyards. Loads also need to be moved or hoisted in an entertainment environment both in setting up and decommissioning a site and during use for example during a stage or theatre production. Safe, efficient, swift and quiet movement of a load, for example stage scenery and lighting rigs, or perhaps people may be required in this environment.

The provision of a service, for example water, power or data to the load being moved or hoisted may be required and this will typically be delivered by a secondary line to the load. As the load is hoisted or lowered, the secondary line will be shortened or extended and without effective management of the secondary line, a risk of fouling the line exists, potentially interrupting the secondary function. During hoisting, hanging loops of the secondary line may form running the risk of fouling or, where aesthetics are important, appearing unsightly. Where a number of hoists and secondary lines are being operated in close proximity, such problems may be exacerbated. It is essential therefore to ensure that the secondary line is managed effectively to reduce this risk.

Generally two types of device for managing a secondary line are known; a "solid" device and a "split" device. These devices are mounted on a line, for example a chain or cable and are movable longitudinally along the line. The secondary service supply line is also connected to the device so as to manage the secondary line during hoisting or lowering of the load.

Solid devices typically comprise a longitudinal aperture through which the chain or cable is passed so the device fits snugly around the cable or chain and is free to run along the cable or chain. Devices of this type are generally safe but cumbersome and labour-intensive to use. As the cable or chain must be threaded through the device and must fit snugly for effective operation, any attachment to the cable or chain, for example a hook, has to be removed to allow the device to be thread on the cable or chain. Furthermore, during use, removal or addition of further devices to the chain or cable is not possible without temporarily de-commissioning the chain or cable and removing any attachments. Removal and reattachment may involve the use of tools and require retesting upon reassembly and so be complicated and time-consuming. These problems are exacerbated if hoisting to a significant height, or moving heavy, fragile or complex a load.

Split devices typically comprise two parts which are releasably secured and so do not have the disadvantage of solid devices of needing to be threaded on the end of the line. However known split devices may spin on the chain or cable creating instability and undesirable noise in the workplace and potentially creating a major safety hazard through entanglement of the load-bearing cable or chain with the secondary line. Split devices typically involve a number of small parts for example nuts and bolts and so are complex and time-consuming to use, labour intensive and not entirely reliable. This may be especially problematic and create a safety hazard during a performance in an entertainment environment if for example nuts loosen and the device fails or falls to the ground or performance area.

We have now found that the problems associated with known devices for management of secondary lines may be reduced or avoided by employing a device having two or more releasably securable inter-engaging parts.

In a first aspect, the invention provides a line-management device for use in applications involving hosting a load, the device having two or more parts, each part being releasably securable to at least one other part and comprising a body portion and engaging means for securably engaging with at least one other part and being shaped such that, in combination with the other part, a cavity is defined for receiving a load-bearing line, the device comprising attachment means for attachment of a secondary line to be managed and, in use, the device being moveable longitudinally about the load-bearing line.

The invention provides in a further aspect, a method of managing a secondary cable providing a service to a load being suspended by a load-bearing line, the method comprising applying a device to the load-bearing line, the device comprising two or more inter-engaging complementary parts, each part comprising a body portion and engaging means for securably engaging with at least one other part and being shaped such that, in combination with the other part, a cavity is defined for receiving the load-bearing line and the device being moveable along the line to the line, attaching the secondary line to the device whereby as the load bearing line is raised, the device moves along the line and furls the secondary line.

The device engages in a safe and simple manner with a load bearing line, for example a cable or chain, and provides a means of managing a secondary line which provides the conduit for the secondary function as the load is hoisted or lowered between positions.

The device advantageously may be employed or removed from a chain or cable without the need to remove an attachment, for example a hook, as it does not need to be threaded on the line. The parts are secured together, preferably without the need for tools, in a simple and effective manner so providing for safe, reliable and quiet operation. This provides for ease and speed of use which is especially beneficial when used in inaccessible areas.

Suitably, the parts of the device are shaped to define a cavity when assembled such that the device does not rotate relative to the load-bearing line. The secondary line may be managed much more effectively with predictable furling of the secondary lines.

Each part engages with another part by engaging means which may be of any suitable configuration to enable simple, rapid manual engagement of two or more parts.

Preferably each part comprises two or more engaging means such that in use each part is secured to another part by at least two pairs of complementary engaging means.

In a preferred embodiment, the engaging means comprises complementary interlocking parts for example a tongue and groove arrangement wherein one part comprises a protruding tongue and the another part a channel or groove for receiving the tongue. In an especially preferred embodiment, the tongue and groove are square or rectangular in cross-section, for ease of manufacture.

As desired the tongue may be shaped such that the part of the tongue adjacent to the body portion is narrower than the part of the tongue more distant from the body portion and the top or opening of the channel is narrower than the floor of the channel such that the tongue is retained in the groove for example, a tongue and groove having a trapezoidal shaped cross-section.

Suitably the tongue and groove arrangement allows the complementary parts to be assembled by placing each part along side the load-bearing line in a longitudinally off-set arrangement and, for each set of complementary engaging means, one end of the tongue to slidably engage one end of the groove on the other part and upon alignment and engagement, to be moved relative to each other so as to assemble the device about the load-bearing line.

The at least two parts are suitably provided with means to restrict or prevent the parts from moving relative to each other in use for example apertures, to enable the parts, when assembled, to be secured together by conventional means for example cable ties. The body portions may comprise a locking means such when the parts are assembled, the locking means retains the parts in fixed relation, for example with a snap-fit mechanism. Preferably, the locking means are manually releasable to enable release and reuse of the device.

The complementary engaging means suitably extends along at least part of the body portion and preferably along substantially the length of the body portion whereby the complementary parts may be assembled or disassembled around the load-bearing line.

The engaging means are suitably secured together without the use of tools and the body portions engage with each other to define the cavity through which the load-bearing line passes.

The body portion of each part may be shaped such that when the device is assembled it has any external shape as desired according to the particular application. Preferably the device will be shaped for ease of manual manipulation. The device suitably comprises a recess or aperture to permit easy securing of the parts together, for example by means of cable ties. The device comprises one or more means by which the secondary line may be secured to the device, for example an aperture. The secondary line may be secured by any appropriate means for example cable ties.

The part of the body portion which forms part of the wall defining the cavity when assembled may be shaped as desired according to the shape of the load-bearing line. Suitably the cavity is of a cross-section which is complementary with the cross-section of the load-bearing line.

In many applications, especially in the entertainment environment, the load-bearing line typically comprises a chain. For such applications, the device preferably has a cavity with a cross-shaped cross-section of such dimensions as to snugly fit about the chain links. In an especially preferred embodiment, the device is the length of at least three chain links. Advantageously, this provides for smoother running and reduces the risk of the links moving out of line and interrupting smooth running of the device along the chain.

A further advantage of the present invention when used with a chain is that the surface of one part is such that it is retained on the chain in the event of failure thereby avoiding a safety hazard. Each part preferably comprising two channels along the length of the part and disposed at right angle to each other such that on joining two parts, the four channels provide a longitudinal cavity having a cross-shaped cross-section.

Preferably, the part is shaped so as to be self-retaining on the chain.

In assembling the device for use with a chain, a link of the chain is suitably moved out of the longitudinal axis of the chain and one part is slid onto the adjacent link. By moving a link out of line below or above the part engaged with the chain, the second part may be slid onto the chain and engaged with the first part so forming the device on the chain.

It is preferred that the device comprises two parts. It is also preferred that the parts are identical to allow for ease of use and avoid the need for matching different female and male parts.

Suitably, the device is constructed of plastics material, for example by injection or blow-moulding for ease of manufacture, weight and cost and provides self lubrication and hence quiet operation when moving relative to the load-bearing line.

The device and method of the invention are particularly useful in cable management in the entertainment industry, for example in manoeuvering lighting rigs. Lighting rigs may need to be moved rapidly, with sharp changes in direction and be movable in any direction with minimal noise. The lights need also to be powered and may need to receive electronic data to provide the desired visual effect. This requires fine control of load-bearing lines from which such a rig may be suspended and attendant fine control of the secondary lines for providing power data and the like. The present device provides such control.

In a further aspect, the invention provides a suspendable entertainment system comprising a load having an electronically-operated device and, in use, being suspended by a plurality of chains, a power cable and optionally a data cable to provide power and data to the electronically-operated device and a supply line management device according to the invention adapted to be, in use, fixable to the chain whereby the management device slideable along the chain and to which the secondary cable is attachable.

The entertainment system suitably comprises a lighting rig.

The invention further provides a method of managing a power cable in moving an entertainment system using a device according to the present invention.

A non-limiting example of the invention is described with reference to the following drawings in which.

Figure 1:
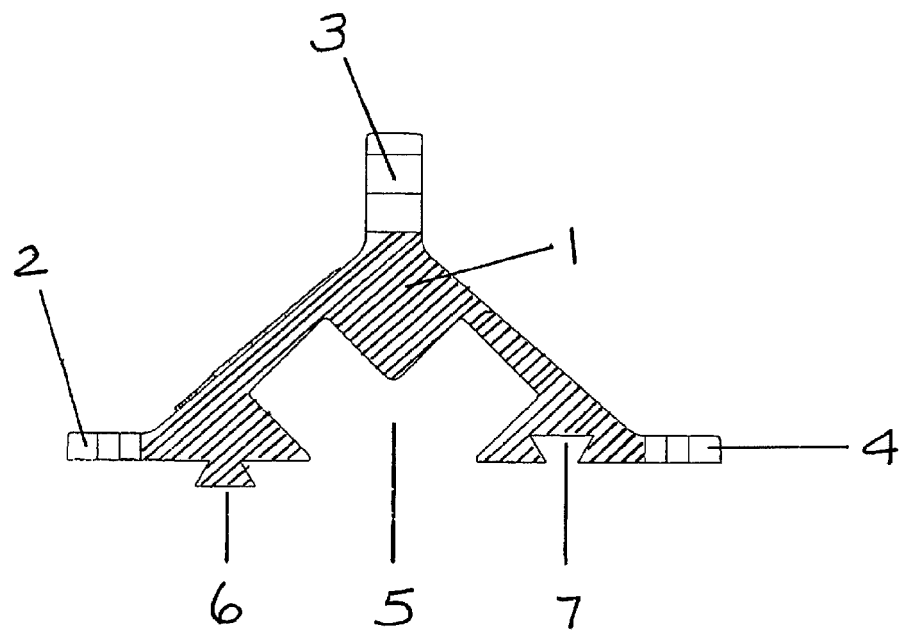
FIG. 1 shows a cross section of a part, two of which when assembled provide a device according to the invention.

In FIG. 1, body portion (1) is shaped for ease of manual manipulation during use. Body portion (1) comprises lugs (2), (3) and (4) which the user may readily grip in assembling or disassembling the device. Surface (5) defines in cross-section one half of a cross. Upon assembly with an identical part, surface (5) of the two parts in cross-section defines a cross for receiving perpendicular adjacent links of a load-bearing chain. The engaging means (6) and (7) are a protruding tongue and a recessed channel respectively and on assembly with an identical part, engage with, respectively a recessed channel (7) and a protruding tongue (6) on the identical part (not shown).

Figure 2:
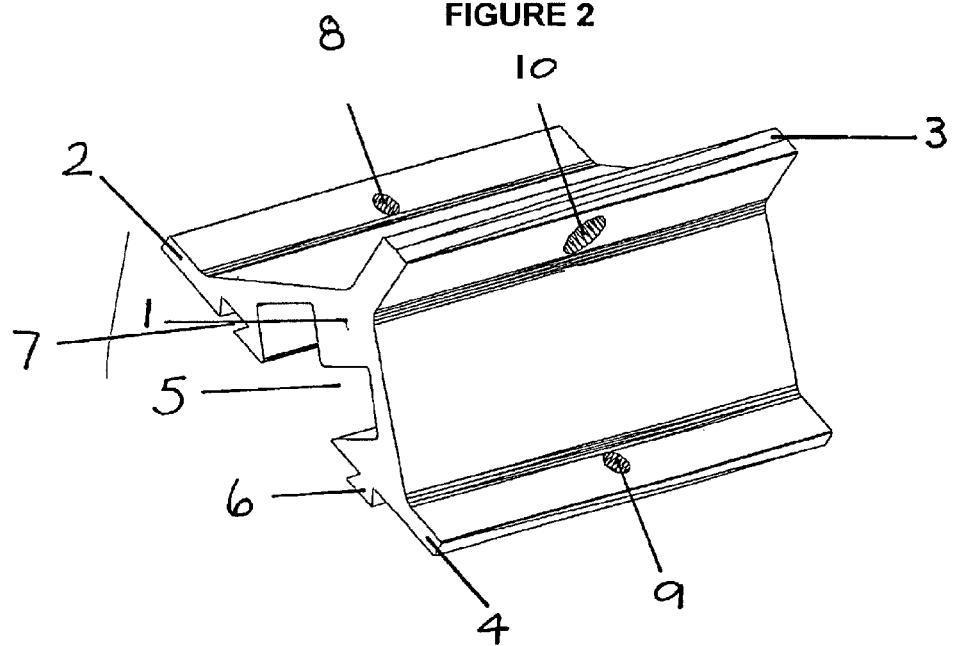
FIG. 2 shows a perspective view of a part, two of which when assembled provide a device according to the invention.

FIG. 2 shows body portion (1), lugs (2), (3) and (4), cavity surface (5) and engagement means (6) and (7). On assembly with an identical part, the two parts when engaged will not able to move laterally of each other but will be slideable longitudinally. Apertures (8) and (9) are provided such that the two parts may be fixed in longitudinal relationship, for example by cable ties. The part also is provided with attachment means (10) by which the secondary line may be secured to the device, for example by a cable tie.

The invention claimed is:

1. A line-management device comprising two or more parts, each part being releasably securable to at least one other part and comprising a body portion and engaging means for securably engaging with at least one other part and being shaped such that, in combination with the other part, a cavity is defined for receiving a load-bearing line, the device comprising attachment means for attachment of a secondary line to be managed and, in use, the device being moveable longitudinally about the load-bearing line.

2. The line-management device according to claim 1 consisting of two parts.

3. The line-management device according to claim 2 in which the parts are identical.

4. The line-management device according to claim 1 for use with a load-bearing line comprising a chain and a secondary line providing a service to a load attached to the load-bearing line, the service being selected from power, electronic data, compressed gas and water.

5. The line-management device according to claim 1 wherein the cavity has the same cross-section as the load bearing line enabling a snug, slideable fit of the line in the cavity.

6. The line-management device according to claim 1 wherein each part comprises two or more engaging means such that in use each part is secured to another part by at least two pairs of complementary engaging means.

7. The line-management device according to claim 1 wherein the engaging means comprises complementary interlocking parts.

8. The line-management device according to claim 7 in which the interlocking parts comprise a tongue and groove.

9. The line-management device according to claim 8 in which the tongue and groove have a square or rectangular shaped cross-section.

10. The line-management device according to claim 1 wherein the at least two parts comprise means to restrict or prevent the parts from moving relative to each other.

11. The line-management device according to claim 10 wherein the means comprises apertures whereby the parts may be secured together.

12. The line-management device according to claim 10 wherein the means comprise manually releasable locking means.

13. The line-management device according to claim 1 wherein the engaging means are suitably secured together without the use of tools.

14. The line-management device according to claim 1 wherein the attachment means by which the secondary line is secured to the device comprises an aperture.

15. The line-management device according to claim 1 for use with a load-bearing line comprising a chain wherein the device has a cavity with a cross-shaped cross-section of such dimensions as to snugly fit about the chain links.

16. The line-management device according to claim 15 wherein the device is at least the length of three chain links.

17. The line-management device according to claim 15 in which the part is shaped so as to be self-retaining on the chain.

18. The line-management device according to claim 1 which is constructed of plastics material.

19. A method of managing a secondary line providing a service to a load being suspended by a load-bearing line, the method comprising applying a device to the load-bearing line, the device comprising two or more inter-engaging complementary parts, each part comprising a body portion and engaging means for securably engaging with at least one other part and being shaped such that, in combination with the other part, a cavity is defined for receiving the load-bearing line and the device being moveable along the load-bearing line, attaching the secondary line to the device whereby as the load bearing line is raised, the device moves along the load-bearing line and furls the secondary line.

20. A suspendable entertainment system comprising a load having an electronically-operated device and, in use, being suspended by a plurality of chains, a power cable and optionally a data cable to provide power and data to the electronically-operated device and a supply line management device according to claim 1 adapted to be, in use, fixable to the chain whereby the management device is slideable along the chain and to which at least one of the power cable and the data cable is attachable.

21. The system according to claim 20 in which the entertainment system comprises a lighting rig.

* * * * *